United States Patent Office 3,539,550
Patented Nov. 10, 1970

1

3,539,550
PROCESS FOR THE PREPARATION OF 2'-HALO-2'-DEOXY PYRIMIDINE NUCLEOSIDES
Seymour Greenberg, Palo Alto, and John G. Moffatt, Los Altos, Calif., assignors to Syntex Corporation, Panama, Panama, a corporation of Panama
No Drawing. Filed Jan. 23, 1967, Ser. No. 610,771
Int. Cl. C07c 51/50
U.S. Cl. 260—211.5                10 Claims

ABSTRACT OF THE DISCLOSURE

2'-halo-2'-deoxypyrimidine nucleosides are prepared by a new process which avoids the steps of introducing protecting groups and subsequently removing them in order to maintain free hydroxy groups on the sugar moiety of the pyrimidine nucleosides. This process provides a convenient two-step process for the preparation of the 2'-fluoro, 2'-chloro, 2'-bromo, and 2'-iodo-2'deoxypyrimidine nucelosides from a pyrimidine nucleoside containing free hydroxy groups on the sugar moiety. Representatively, the pyrimidine nucleoside is heated with an α-acyloxy acyl halide either alone or in an inert organic solvent to afford an intermediate, and this intermediate is then hydrolyzed under basic conditions to afford the 2'-halo-2'-deoxypyrimidine nucleoside. The process provides a convenient process for preparing, for example, important 2'-bromo and 2'-iodo-2'-deoxypyrimidine nucelosides which are subsequently converted by conventional hydrogenolysis to the corresponding 2'-deoxypyrimidine nucleosides, the latter being of considerable use in biomedical research.

BACKGROUND OF THE INVENTION

Field of the invention

This invention pertains to a novel process for the preparation of 2'-halo-2'-deoxypyrimidine nucleosides wherein the improvement process comprises:

(1) Reacting a pyrimidine nucleoside containing free hydroxy groups on the sugar moiety, either alone or in an inert oragnic solvent, with an α-acyloxy acyl halide of the formula:

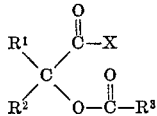

in which:

$R^1$ is hydrogen, lower alkyl, cycloalkyl, aryl, alkaryl or aralkyl;

$R^2$ is lower alkyl, aryl, alkaryl or aralkyl, $R^2$ being aryl, alkaryl or aralkyl when $R^1$ is hydrogen;

$R^3$ is hydrogen, lower alkyl, aryl, alkaryl or aralkyl; and

X is fluoro, chloro, bromo or iodo;

to obtain an intermediate; and (2) Hydrolyzing the thus-formed intermediate under basic conditions such as in a lower alcohol solvent with an alkali metal alcoholate thereof or in a lower alcohol solvent with concentrated aqueous ammonia to obtain a corresponding 2'-halo-2'-deoxypyrimidine nucleoside. The pyrimidine nucleoside containing free hydroxy groups on the sugar moiety is selected from those having free hydroxy groups at the 2'-, 3'- and 5'-positions or those having free hydroxy groups at the 2'- and 3'-positions.

2

Description of prior art

Heretofore, the 2'-halo-2'-deoxypyrimidine nucleosides were prepared by a multi-step process involving the introduction and removal of protecting groups as described by J. F. Codington et al., J. Org. Chem., 29, 558 (1964). The various steps consisted of:

(1) Introducing a protecting group at the 5'-position,
(2) Introducing a tosyl group at the 2'-position,
(3) Forming a corresponding 2,2'-anhydro-1-(5'-protected-β-D-arabinofuranosyl)pyrimidine,
(4) Removing the 5'-protecting group with formation of the 2,2'-anhydro-(1-β-D-arabinosyl)pyrimidine, and
(5) Introducing the 2'-halo substituent.

For example, 2'-chloro-2'-deoxyuridine was obtained by reaction of 2,2'-anhydro-1-β-D-arabinosyluracil with hydrogen chloride at 75–80° C. in dioxane. The 2'-bromo-2'-deoxyuridine was obtained by an analogous reaction with hydrogen bromide. The 2'-fluoro-2'-deoxyuridine was obtained using hydrogen fluoride in dioxane but in a stainless steel container and at higher temperatures.

The process of the present invention provides a process for the preparation of a 2'-halo-2'-deoxypyrimidine nucleoside which obviates the step-wise process as described in the literature. The process is effectively a one-step process since the intermediate from the first step does not have to be isolated or purified before its conversion to the 2'-halo-2'-deoxypyrimidine nucleoside.

SUMMARY

The process of the invention provides a method for the introduction of the 2'-halo substituent into the sugar moiety of a pyrimidine nucleoside which obviates the requirement of introducing one or more protecting groups at the hydroxy functions prior to the introduction of the 2'-halo substituent. The process further provides a method for reacting the pyrimidine nucleoside containing free hydroxy groups at the 2',3'- and 5'-positions or at the 2'- and 3'-positions of the sugar moiety with an α-acyloxy acyl halide and subsequently with a base to produce the 2'-halo-2'-deoxypyrimidine nucleoside in a more economical and efficient process than that of the prior-art.

Recent progress in biochemical research has indicated the unique importance of 2'-deoxynucleosides and particularly of 2'-deoxypyrimidine nucleosides. In particular, 5-iodo-2'-deoxyuridine and 5-methylamino-2'-deoxyuridine are well-known as highly specific anti-viral agents. In addition, it is well-known that 5-fluoro-2'-deoxyuridine and 5-trifluoromethyl-2'-deoxyuridine are among the most active known antagonists of nucleic acid biosynthesis. In general, the 2'-deoxypyrimidine nucleosides are more active anti-metabolities than the corresponding ribosides. The process of the invention further provides a process for the preparation of important and biologically significant 2'-deoxypyrimidine nucleosides, useful in biochemical research.

One object of the present invention is to provide a process for the preparation of a 2'-halo-2'-deoxypyrimidine nucleoside which introduces the protecting groups and 2'-halo substituent in the same step. A second object of the present invention is to provide a process for the preparation of a 2'-bromo or 2'-iodo-2'-deoxypyrimidine nucleoside which can be hydrogenolyzed by a conventional technique to the corresponding 2'-deoxypyrimidine nucleoside.

DESCRIPTION OF THE PREFERRED EMBODIMENT

The process of the present invention can be illustrated by the following reaction scheme in which only that portion which enters into the process is shown:

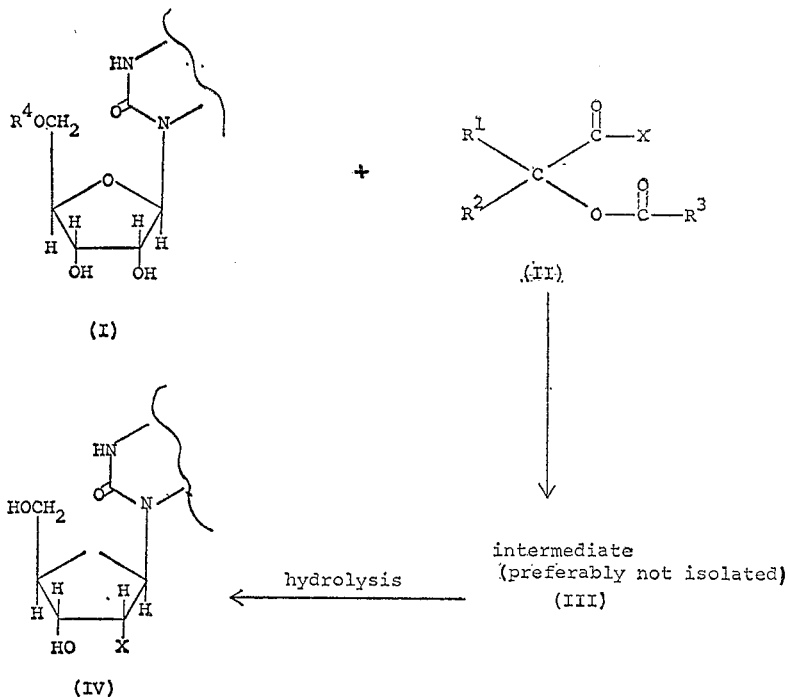

wherein $R^4$ is hydrogen, a carboxylic acyl group containing less than 12 carbon atoms or an alkyl carbonate in which the alkyl portion contains less than 8 carbon atoms; and all other substituents are as shown hereinabove.

In the definition of the $R^1$, $R^2$ and $R^3$ substituents, by the term "alkyl" is meant a straight or branched chain group containing less than 8 carbon atoms, inclusive such as methyl, ethyl, isopropyl, sec-butyl, hexyl and the like. By the term "aryl" is meant a group containing one aromatic ring such as phenyl. By the term "alkaryl" is meant a phenyl group containing one or more alkyl substituents on the phenyl group such as o-tolyl, m-tolyl, p-isopropylphenyl, 2,3-dimethylphenyl, 3,5-dimethylphenyl, and the like. By the term "aralkyl" is meant an alkyl group containing a phenyl substituent such as benzyl and the like. By the term "cycloalkyl" is meant a cyclic group containing from three to six carbon atoms such as cyclopropyl, cyclobutyl, cyclopentyl or cyclohexyl.

In the process of the present invention, the pyrimidine nucleoside of Formula I is allowed to react with an α-acyloxy acyl halide of Formula II, either alone or in an inert organic solvent such as nitromethane, glacial acetic acid, chloroform, ethyl acetate, 1,2-dimethoxyethane, benzene, dimethylformamide, butyrolactone, acetonitrile and the like, at a temperature of about 25° C. to about 150° C., and preferably at 100° C., or at the reflux temperature of the solvent, for a period of from about 15 minutes to about 8 hours or more, preferably from 30 minutes to four hours. During the reaction time, there is some evolution of hydrogen halide, and by the end of the reaction time, the reaction mixture has become homogeneous.

The resulting intermediate from the above reaction is preferably not isolated but treated in a lower alcohol solvent with a corresponding alkali metal alcoholate thereof such as in methanol with sodium methoxide, in ethanol with potassium ethoxide and the like, or in a lower alcohol solvent with concentrated aqueous ammonia hydroxide, at a temperature of about 25° C. to the reflux temperature of the lower alcohol solvent, and preferably at the former, for a period of time of about ¼ to about four hours to produce thereby a corresponding 2'-halo-2'-deoxypyrimidine nucleoside of Formula IV.

Alternatively, for the preparation of the 2'-bromo-2'-deoxypyrimidine nucleoside, the pyrimidine nucleoside of Formula I is allowed to react with an α-acyloxy acyl chloride of Formula II wherein X is chloro, in the presence of at least a molar excess of an alkali metal bromide, preferably lithium bromide or a quaternary ammonium bromide such as tetramethylammonium bromide, tetra-n-butyl ammonium bromide, hexadecyltrimethylammonium bromide, or the like, in an inert organic solvent in which the bromide salt is substantially soluble such as chloroform, acetonitrile, acetic acid, and the like, at a temperature of from about 25° C. to about 100° C., and preferably at the latter for a period of from about one-half to about four hours. The thus-formed intermediate is then treated as described hereinabove with an alkali metal alcoholate or concentrated aqueous ammonium hydroxide, to yield the corresponding 2'-bromo-2'-deoxypyrimidine nucleoside.

Alternatively, in a similar fashion, the 2'-iodo-2'-deoxypyrimidine nucleoside is prepared in a reaction analogous to the one for the 2'-bromo-2'-deoxypyrimidine nucleoside by substituting an alkali metal iodide or a quaternary ammonium iodide for the bromides in the process of the preceding paragraph.

A thus-obtained 2'-bromo-2'-deoxypyrimidine nucleoside or 2'-iodo-2'-deoxypyrimidine nucleoside of Formula IV wherein X is bromo or iodo, is readily reduced to a corresponding 2'-deoxypyrimidine nucleoside by conventional hydrogenolysis under one atmosphere of hydrogen and over a hydrogenolysis catalyst such as palladium-barium sulfate in a solvent such as water, ethyl alcohol and the like.

In the practice of the process, the α-acyloxy acyl halide of Formula II is present in at least a molar quantity and preferably a three-fold molar quantity, relative to the pyrimidine nucleoside of Formula I. Preferably, the process is conducted in the absence of a solvent and at a temperature of 100° C. or in glacial acetic acid at a temperature of 100° C.

Whereas the concentration of the reactants of Formulas I and II in the solvent is not critical, a convenient concentration is 1 millimole of pyrimidine nucleoside of Formula I, at least 3 millimoles of α-acyloxy acyl halide of Formula II, in from 2 to 20 ml. of the inert organic solvent.

As shown in the above sequence, the pyrimidine nucleoside of Formula I contains free hydroxy groups on the sugar moiety at the 2',3'- and 5'-positions (i.e., $R^4$=H) or at the 2'- and 3'-positions (i.e., $R^4$=a carboxylic acyl or an alkyl carbonate group). In the practice of the process, the intermediate III is invariably a mixture of products which is preferably not isolated but subsequently hydrolyzed to the 2'-halo-2'-deoxypyrimidine nucleoside of Formula IV.

In those cases wherein the process is performed in an inert organic solvent with a starting material of Formula I containing free hydroxy groups at the 2',3'- and 5'-positions (i.e., $R^4$=H), the choice of solvent seriously affects the structure of the intermediate III. For example, when the process of the invention is performed in a solvent such as chloroform or nitromethane, the structure of the predominant intermediate is as shown by Formula III-A, namely

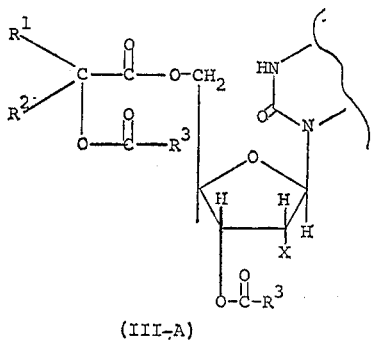

(III-A)

wherein all substituents are as defined hereinabove.

When the process of the invention is performed in glacial acetic acid, the structure of the predominant intermediate is as shown by Formula III-B, namely

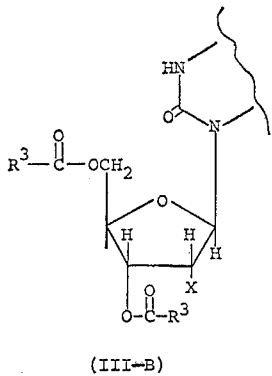

(III-B)

wherein all substituents are as defined hereinabove. In addition, when the process is performed in ethyl acetate, acetonitrile or dimethylformamide, the structure of the predominant intermediate is as shown by Formula III-C, namely

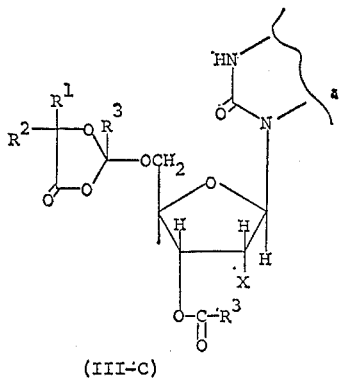

(III-C)

wherein all substituents are as defined hereinabove.

Representative of pyrimidine nucleosides having free hydroxy groups at the 2',3'- and 5'-positions in the sugar moiety and which can be employed as starting materials in the process of the present invention are uridine, cytidine, pseudouridine, isocytidine, and various derivatives thereof such as: 5-methyluridine; 6-azauridine; 5-azauridine; 4-thiouridine; 6-azathymidine; 2-thiouridine; 2-methylthiouridine; 5-fluorouridine; 5-trifluoromethyluridine; 5-iodouridine; 5-bromouridine; 5-chlorouridine; 5-aminouridine; 5-methylaminouridine; 5-dimethylaminouridine; 5,6-dihydrouridine; 5,6-dihydro-5-methyluridine; 5-hydroxyuridine; 3-methyluridine; 6-methyluridine; 6-methyl-2-thiouridine; 6-methyl-4-thiouridine; 5-nitrouridine; 6-propyl-2-thiouridine; 5-methylcytidine; 6-azacytidine; 5-azacytidine; 5-fluorocytidine; 5-chlorocytidine; 5-bromocytidine; 5-iodocytidine; 5-trifluoromethylcytidine; 5-aminocytidine; 5-methylaminocytidine; and 5-dimethylaminocytidine.

In addition, the above pyrimidine nucleosides can have the free hydroxy group at the 5'-position of the sugar moiety protected with a conventional protecting agent such as a carboxylic acyl group containing less than 12 carbon atoms or an alkyl carbonate group, and these can be employed in the process of the present invention.

The α-acyloxy acyl halide of Formula II, i.e.

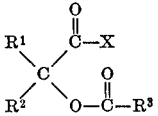

is prepared from a corresponding α-hydroxy acid. For the preparation of the α-acyloxy free acid, the α-hydroxy free acid is acetylated by treatment with an acid chloride of the formula

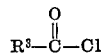

wherein $R^3$ is as defined hereinabove, either alone or in a non-reactive organic solvent such as benzene, toluene or the like, which may optionally contain a tertiary base such as pyridine, N,N-dimethylaniline or the like.

For the preparation of the α-acyloxy acyl fluoride, the corresponding α-acyloxy free acid is allowed to react with at least a molar equivalent of N-(2-chloro-1,1,2-trifluoroethyl)-diethylamine in an inert solvent such as diethyl ether, acetonitrile, methylene chloride and the like, at a temperature of from about 0° C. to about 50° C. and preferably at 25° C. for a period of about one to ten hours, and preferably for five hours.

For the preparation of the α-acyloxy acyl chloride, the corresponding α-acyloxy free acid is allowed to react with thionyl chloride or oxalyl chloride in an inert halogenated solvent such as methylene chloride, chloroform and the like, at a temperature of about 25° C. for a period of from 1 to 12 hours. In an alternative method, the free acid is treated with triphenyl phosphine in carbon tetrachloride at a temperature of about 25° C. for a period of about 1 to about 12 hours, and preferably at the latter time period.

For the preparation of the α-acyloxy acyl bromides, the corresponding α-acyloxy free acid is allowed to react with an excess of phosphorous tribromide at reflux temperature for a period of about four hours. In an alternative method, the α-acyloxy acyl chloride is allowed to react with an alkali metal bromide, preferably lithium bromide, or a quaternary ammonium bromide, such as tetramethylammonium bromide, tetraethylammonium bromide and the like, but preferably with the alkali metal bromide in an inert solvent such as ethyl acetate, dioxane and the like, at a temperature of about 25° C. for a period of about one-half hour.

For the preparation of the α-acyloxy acyl iodide the corresponding α-acyloxy acyl chloride is allowed to react with an alkali metal iodide, preferably lithium iodide, or a quaternary ammonium iodide such as tetramethylammonium iodide, tetraethylammonium iodide and the like, but preferably with the alkali metal iodide, in an inert solvent such as ethyl acetate, dioxane, dimethylformamide and the like, at a temperature of about 25° C. for a period of about one-half hour.

Among the α-hydroxy acids of the formula:

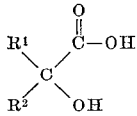

wherein $R^1$ and $R^2$ are as defined hereinabove, which can be used in preparing the α-acyloxy acyl halides of Formula II by the methods as described above, are lactic acid analogs such as 2-methyl lactic acid; atrolactic acid; 2-hydroxy-2-methyl butyric acid; 2-hydroxy-2-methyl valeric acid; 2-hydroxy-2-ethyl butyric acid; 2-hydroxy-2-methyl hexanoic acid; 2,3-diphenyl lactic acid; 2-methyl-3-phenyl lactic acid; and the like: mandelic acid and its analogs such as α-ethyl mandelic acid; α-propyl mandelic acid; α-isopropyl mandelic acid; α-butyl mandelic acid; α-isobutyl mandelic acid; α-sec-butyl mandelic acid; α-isopentylmandelic acid; α-hexyl mandelic acid; m-methyl mandelic acid; p-isopropyl mandelic acid; α-cyclopropyl mandelic acid; α-cyclo-butyl mandelic acid; α-cyclopentyl mandelic acid; α-cyclohexyl mandelic acid; and the like: and benzilic acid and its analogs such as 3-methyl benzilic acid; 4-methyl benzilic acid; 2,3-dimethyl benzilic acid; 2,4-dimethyl benzilic acid; 2,5-dimethyl benzilic acid; 2,6-dimethyl benzilic acid; 3,4-dimethyl benzilic acid; 3,5-dimethyl benzilic acid; 2,2'-dimethyl benzilic acid; 3,3'-dimethyl benzilic acid; 4,4'-dimethyl benzilic acid; 2,3,4,6-tetramethyl benzilic acid; 2,3,5,6-tetramethyl benzilic acid; 3,3',4,4'-tetramethyl benzilic acid; 3,3', 5,5'-tetramethyl benzilic acid; and the like.

The following examples serve to illustrate the present invention but are not intended to limit the scope thereof.

EXAMPLE 1

A mixture of 2.5 g. of uridine and 5 g. of α-acetoxyisobutyryl chloride is heated at 100° C. for one-half hour during which time there is considerable evolution of hydrogen chloride. The resulting homogeneous mixture is cooled and then dissolved in 25 ml. of methylene chloride. The organic phase is washed with aqueous sodium bicarbonate solution, then with water to neutrality, dried over magnesium sulfate and evaporated to dryness to yield a clear gum intermediate.

The clear gum intermediate is dissolved in 60 ml. of methanol in which has been previously dissolved 0.7 g. of metallic sodium. This mixture is allowed to stand at room temperature for a period of 1½ hours and then neutralized with Dowex-50 (ion exchange resin sulfonated polystyrene beads crosslinked with 8% divinylbenzene). The solution is evaporated to dryness under reduced pressure to give 2'-chloro-2'-deoxyuridine, after recrystallization from methanol.

In a similar fashion, utilizing the above procedure, the following pyrimidine nucleosides are reacted with the listed α-acyloxy acyl halides to yield the 2'-halo-2'-deoxypyrimidine nucleosides listed as final products, namely

| Pyrimidine nucleoside | α-Acyloxy acid halide | 2'-halo-2'-deoxy-pyrimidine nucleoside |
|---|---|---|
| 5-iodouridine | 2-acetoxy-2-ethyl-butyryl bromide. | 2'-bromo-2'-deoxy-5-iodouridine. |
| 5-methylaminouridine | α-Benzoyloxy-benzilic acid chloride. | 2'-chloro-2'-deoxy-5-methylamino-uridine. |
| 5-trifluormethyluridine | α-Acetoxyisobutyryl chloride. | 2'-chloro-2'-deoxy-5-trifluoromethyl-uridine. |
| 5-fluorouridine | α-Butyroyloxy-α-butyl mandelic acid bromide. | 2'-bromo-2'-deoxy-5-fluorouridine. |

EXAMPLE 2

A mixture of 2.5 g. of cytidine, 6 g. of α-acetoxyisobutyryl bromide in 50 ml. of glacial acetic acid is heated at reflux for two hours during which time there is considerable evolution of hydrogen bromide. The mixture is cooled and then dissolved in 25 ml. of methylene chloride. The organic phase is washed with aqueous sodium bicarbonate solution then with water to neutrality, dried over magnesium sulfate and evaporated to dryness to yield a substantially clear gum intermediate.

The clear gum intermediate is dissolved in a mixture of 30 ml. of concentrated ammonium hydroxide and 30 ml. of methanol. This mixture is allowed to stand at room temperature for a period of two hours and then evaporated to dryness under reduced pressure to yield 2'-bromo-2'-deoxycytidine after recrystallization from methanol.

A solution of 2 g. of 2'-bromo-2'-deoxycytidine in 60 ml. of water containing 1 ml. of triethylamine is hydrogenated under atmospheric pressure and at 25° C. in the presence of 0.8 g. of 5% palladium-on-barium sulfate catalyst. When 1.1 molar equivalents of hydrogen are absorbed, the reaction is stopped. The catalyst is removed by filtration through Celite diatomaceous earth and washed with water and the combined filtrate and washings are evaporated to dryness under reduced pressure. The residue is recrystallized from anhydrous ethanol to yield 2'-deoxycytidine.

Utilizing the same reactants and conditions as so stated above with the one exception, namely the nitromethane is substituted for glacial acetic acid in the reaction, there is obtained the 2'-deoxycytidine in essentially the same yield and of the same purity.

EXAMPLE 3

A mixture of 2 g. of 5-fluorouridine, 5 g. of α-acetoxyisobutyryl chloride and 20 g. of lithium bromide in 100 ml. of chloroform is heated at reflux for a period of four hours. The resulting solution is cooled and evaporated to a gum, triturated with ether and filtered. The organic phase is washed with aqueous sodium bicarbonate solution, then with water to neutrality, dried over magnesium sulfate and evaporated to dryness to yield a clear gum intermediate.

The clear gum intermediate is dissolved in 60 ml. of methanol in which has been previously dissolved 0.7 g. of metallic sodium. This mixture is allowed to stand at room temperature for one-half hour and then neutralized with Dowex–50 (acid form) resin. This solution is evaporated to dryness under reduced pressure and recrystallized from methanol to yield 2'-bromo-2'-deoxy-5-fluorouridine.

A solution of 2 g. of 2'-bromo-2'-deoxy-5-fluorouridine in 60 ml. of water containing 1 ml. of triethylamine is hydrogenated under atmospheric pressure and at 25° C. in the presence of 0.8 g. of 5% palladium-on-barium sulfate catalyst. When 1.1 molar equivalents of hydrogen are absorbed, the reaction is stopped. The catalyst is removed by filtration through Celite diatomaceous earth and washed with water and the combined filtrate and washings are evaporated to dryness under reduced pressure. The residue is recrystallized from anhydrous ethanol to yield 2'-deoxy-5-fluorouridine.

Using the same starting material and conditions as stated above, the first step of overall reaction is conducted in the presence of the following solvents and salts to afford the 2'-deoxy-5-fluorouridine final product, namely

| Solvent | Salt | Final product |
|---|---|---|
| Acetonitrile | Tetra-n-butyl-ammonium bromide | 2'-deoxy-5-fluorouridine. |
| Acetic acid | Lithium bromide | 2'-deoxy-5-fluorouridine. |

EXAMPLE 4

A mixture of 2 g. of uridine, 5 g. of α-acetoxyisobutyryl chloride and 9 g. of sodium iodide in 60 ml. of acetonitrile is heated at reflux for a period of two hours. The resulting solution is evaporated to dryness and triturated with ether and filtered. The organic phase is washed with aqueous sodium bicarbonate solution, then with water to neutrality, dried over magnesium sulfate and evaporated to dryness to yield a clear gum intermediate.

The clear gum intermediate is dissolved in 60 ml. of ethanol in which has been previously dissolved 0.8 g. of metallic sodium. This mixture is allowed to stand at room temperature for one-half hour and then neutralized with Dowex–50 (acid form) resin. This solution is evaporated to dryness under reduced pressure to yield 2'-iodo-2'-deoxyuridine after recrystallization from a methanol: acetone mixture.

Using the same starting material and conditions as stated above, the first step of the overall reaction is conducted in the presence of the following solvents and salts to afford 2'-iodo-2'-deoxyuridine final product, namely Solvent: Dimethylformamide
Salt: Lithium iodide
Final product: 2'-iodo-2'-deoxyuridine.

EXAMPLE 5

A mixture of 1 g. of uridine, 2.5 g. of α-acetoxyisobutyryl bromide in 5 ml. of ethanol in free chloroform is heated at reflux for a period of 48 hours during which time the mixture becomes homogeneous. The resulting mixture is cooled and poured into an aqueous sodium bicarbonate solution. The organic phase is separated, washed with water and dried under magnesium sulfate and subsequently to dryness to yield a resultant gum.

The gum residue is dissolved in 5 ml. of anhydrous methanol and to this solution is added a solution of 0.25 g. of metallic sodium in 10 ml. of methanol. The resultant solution is allowed to stand at room temperature for one-half hour after which it is neutralized with an acid ion exchange resin. The solution is filtered and evaporated to dryness under reduced pressure to give 2'-bromo-2'-deoxyuridine, after recrystallization from methanol.

What is claimed is:

1. A process for the preparation of a 2'-halo-2'-deoxypyrimidine nucleoside from a corresponding pyrimidine nucleoside containing free hydroxy groups on the sugar moiety, which comprises:
   (1) reacting a pyrimidine nucleoside containing free hydroxy groups on the sugar moiety with an α-acyloxy acyl halide of the formula:

$$R^1\diagdown\quad\diagup C-X \atop \diagup C \diagdown \atop R^2\qquad O-\overset{O}{\overset{\|}{C}}-R^3$$

in which:
   $R^1$ is hydrogen, lower alkyl, cycloalkyl, aryl, alkaryl or aralkyl;
   $R^2$ is lower alkyl, aryl, alkaryl or aralkyl, $R^2$ being aryl, alkaryl or aralkyl when $R^1$ is hydrogen;
   $R^3$ is hydrogen, lower alkyl, aryl, alkaryl or aralkyl; and
   X is fluoro, chloro, bromo or iodo,
   to obtain an intermediate; and
   (2) hydroylzing the thus-formed intermediate under basic conditions in a lower alcohol solvent with a corresponding alkali metal alcoholate thereof or in a lower alcohol solvent with concentrated aqueous ammonia hydroxide to obtain a corresponding 2'-halo-2'-deoxypyrimidine nucleoside.

2. The process according to claim 1 wherein the pyrimidine nucleoside containing free hydroxy groups on the sugar moiety is a pyrimidine nucleoside containing free hydrogen groups at the 2', 3'- and 5'-positions of the sugar moiety and the corresponding 2'-halo-2'- deoxypyrimidine nucleoside is a 2'-halo-2'-deoxypyrimidine nucleoside containing free hydroxy groups at the 3'- and 5'-positions of the sugar moiety.

3. The process according to claim 1 wherein the pyrimidine nucleoside containing free hydroxy groups on the sugar moiety is a pyrimidine nucleoside containing free hydroxy groups at the 2'- and 3'-positions of the sugar moiety and the corresponding 2'-halo-2'-deoxypyrimidine nucleoside is a 2'-halo-2'-deoxypyrimidine nucleoside containing free hydroxy groups at the 3'- and 5'-positions of the sugar moiety.

4. The process according to claim 1 wherein step (1) is performed in an inert organic solvent and at a temperature of 50° C. to 100° C.

5. The process according to claim 1 wherein step (1) is conducted at a temperature of 25° C. to 100° C.

6. The process according to claim 1 wherein the α-acyloxy acyl halide is of the formula:

$$R^1\diagdown\quad\diagup C-X \atop \diagup C \diagdown \atop R^2\qquad O-\overset{O}{\overset{\|}{C}}-R^3$$

in which each of $R^1$, $R^2$ and $R^3$ is methyl; and X is chloro; the lower alcohol and the alkali metal alcoholate thereof is methanol and sodium methoxide, respectively; and the corresponding 2'-halo-2'-deoxypyrimidine nucleoside is a 2'-chloro-2'-deoxypyrimidine nucleoside.

7. The process according to claim 1 wherein the α-acyloxy acyl halide is of the formula:

$$R^1\diagdown\quad\diagup C-X \atop \diagup C \diagdown \atop R^2\qquad O-\overset{O}{\overset{\|}{C}}-R^3$$

in which each of $R^1$, $R^2$ and $R^3$ is methyl and X is bromo; and the lower alcohol and the alkali metal alcoholate thereof is methanol and sodium methoxide, respectively; and the corresponding 2'-halo-2'-deoxypyrimidine nucleoside is a 2'-bromo-2'-deoxypyrimidine.

8. The process according to claim 1 wherein the pyrimidine nucleoside is selected from the group: cytidine, 5-fluorouridine, 5-chlorouridine, 5-iodouridine, 5-methylaminouridine, 5-dimethylaminouridine, 5-trifluoromethyluridine, 6-azauridine, 5-methyl-6-azauridine, 5-azauridine, 6-azacytidine, 5-azacytidine, 5-iodocytidine, 5-chlorocytidine, 5-bromocytidine, and 5-fluorocytidine.

9. A process for the preparation of a 2'-bromo-2'-deoxypyrimidine nucleoside from a corresponding pyrimidine nucleoside containing free hydroxy groups on the sugar moiety which comprises:
   (1) reacting a pyrimidine nucleoside containing free hydroxy groups on the sugar moiety with an α-acyloxy acyl chloride of the formula:

$$R^1\diagdown\quad\diagup C-Cl \atop \diagup C \diagdown \atop R^2\qquad O-\overset{O}{\overset{\|}{C}}-R^3$$

wherein:
   $R^1$ is hydrogen, lower alkyl, cycloalkyl, aryl, alkaryl or aralkyl;
   $R^2$ is lower alkyl, aryl, alkaryl or aralkyl, $R^2$ being aryl, alkaryl or aralkyl when $R^1$ is hydrogen; and
   $R^3$ is hydrogen, lower alkyl, aryl, alkaryl or aralkyl;
   in an inert solvent and in the presence of at least a molar excess of a salt selected from an alkali metal bromide or a quaternary ammonium bromide, to obtain an intermediate, and (2) hydrolyzing the thus-obtained intermediate under basic conditions in a lower alcohol solvent with a corresponding alkali metal alcoholate thereof or in a lower alcohol solvent with concentrated aqueous ammonia hydroxide to obtain a corresponding 2'-bromo-2'-deoxypyrimidine nucleoside.

10. A process for the preparation of a 2'-iodo-2'-deoxypyrimidine nucleoside from a corresponding pyrimidine nucleoside containing free hydroxy groups on the sugar moiety, which comprises:

(1) reacting a pyrimidine nucleoside containing free hydroxy groups on the sugar moiety with an α-acyloxy acyl chloride of the formula:

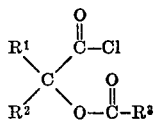

wherein:
$R^1$ is hydrogen, lower alkyl, cycloalkyl, aryl, alkaryl or aralkyl;

$R^2$ is lower alkyl, aryl, alkaryl or aralkyl, $R^2$ being aryl, alkaryl or aralkyl when $R^1$ is hydrogen; and $R^3$ is hydrogen, lower alkyl, aryl, alkaryl or aralkyl;

in an inert solvent and in the presence of at least a molar excess of a salt selected from an alkali metal iodide or a quaternary ammonium iodide to obtain an intermediate, and (2) hydrolyzing the thus-obtained intermediate under basic conditions in a lower alcohol solvent with a corresponding alkali metal alcoholate thereof or in a lower alcohol solvent with concentrated aqueous ammonia hydroxide to obtain a corresponding 2'-iodo-2'-deoxypyrimidine nucleoside.

References Cited
UNITED STATES PATENTS 3,155,646   11/1964   Hunter    260—211.5
3,299,042   1/1967   Lipkin    260—211.5

LEWIS GOTTS, Primary Examiner

JOHNNIE R. BROWN, Assistant Examiner

U.S. Cl. X.R.

260—210, 999